(12) United States Patent
Lindgren

(10) Patent No.: US 8,509,234 B2
(45) Date of Patent: Aug. 13, 2013

(54) SYSTEM AND METHOD FOR IMPLEMENTING A RTP-SIGNALED TERMINAL HAND OVER

(75) Inventor: Tommy Lindgren, Vantaa (FI)

(73) Assignee: Nokia Corporation (FI)

(*) Notice: Subject to any disclaimer, the term of this patent is extended or adjusted under 35 U.S.C. 154(b) by 776 days.

(21) Appl. No.: 11/610,467

(22) Filed: Dec. 13, 2006

(65) Prior Publication Data

US 2008/0144623 A1 Jun. 19, 2008

(51) Int. Cl.
*H04L 12/56* (2011.01)

(52) U.S. Cl.
USPC .......................................... 370/392; 370/503

(58) Field of Classification Search
None
See application file for complete search history.

(56) References Cited

U.S. PATENT DOCUMENTS

| 6,147,986 | A  | * | 11/2000 | Orsic .............................. | 370/349 |
| 6,256,300 | B1 | * | 7/2001  | Ahmed et al. ................ | 370/331 |
| 6,690,659 | B1 | * | 2/2004  | Ahmed et al. ................ | 370/328 |
| 2002/0089998 | A1 | * | 7/2002 | Le ................................. | 370/465 |

OTHER PUBLICATIONS

Vakil, F., "Mobility Management in a SIP Environment Requirements, Functions and Issues", Dec. 2000, Internet Engineering Task Force, Abstract & Section 6.1.*

Schulzrinne et al., Application-layer mobility using SIP. Service Portability and Virtual Customer Environments, 2000 IEEE, p. 29-36, 2000.

Vakil et al., Mobility management in a SIP environment: Requirements, functions and issues. Internet Draft, Dec. 2000.

Dutta et al., Fast-Handoff schemes for application layer mobility management. Personal, Indoor and Mobile Radio Communications, 2004. PIMRC 2004. 15$^{th}$ IEEE International Symposium, vol. 3, 1527-1532, Sep. 5-8, 2004.

Gomez et al., Internet traffic analysis and optimization over a precommercial live UMTS network. Vehicular Technology Conference, vol. 5, p. 2879-2884, 2005.

International Search Report for PCT Patent Application No. PCT/IB2007/055066.

International Preliminary Report on Patentability for International Application No. PCT/IB2007/055066, mailed Jun. 25, 2009, 9 pages.

* cited by examiner

*Primary Examiner* — Chirag Shah
*Assistant Examiner* — Steve Young
(74) *Attorney, Agent, or Firm* — Banner & Witcoff, Ltd.

(57) ABSTRACT

An improved system and method for implementing communications hand over in a simple manner. RTP is used to signal to other terminals that an IP address has been changed for a particular. The receiving communications application notices from the RTP data flow that the other party in a communications session has changed its IP address. Based on this information, the communications application adjusts the communications session without having to perform any session signaling.

20 Claims, 3 Drawing Sheets

SYSTEM AND METHOD FOR IMPLEMENTING A RTP-SIGNALED TERMINAL HAND OVER

FIELD OF THE INVENTION

The present invention relates generally to the use of the Real-Time Transport Protocol (RTP). More particularly, the present invention relates to the use of the RTP protocol in implementing IP communications session hand over functionality without requiring support from a network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mobile terminals require hand over functionality with communications services. For example, when a user moves and/or changes an access network interface, it is important that his or her call not be interrupted during the process. Some access networks implement mobility in layer 2 (e.g. wireless code division multiple access (WCDMA) and Global System for Mobile Communication (GSM)) or by using mobile IP (e.g. WiMAX or Internet-High-Speed Downlink Packet Access (I-HSDPA)). However, there are currently many types of IP networks that do not offer mobility by any mechanism, for example in the case of Wireless Local Area Network (WLAN) hotspots. Additionally, the use of Mobile IP requires the use of a home agent, and the home agent affects the traffic flows (e.g., traffic travels via the home agent).

Multi-radio terminals are becoming increasingly common as the technology surrounding these devices continues to improve at a substantial rate. As a result, a mobile terminal is now more likely than in the past to have many different radio interfaces that it can utilize for communications purposes. For example, a single mobile terminal may be capable of supporting GSM, WCDMA and WLAN. In future products, WiMAX and HSDPA are also expected to be incorporated, resulting in still more interfaces for a terminal.

Traditionally, hand over functionality has been integrated into the mobile networks. However, with several different technologies currently emerging, the hand over implementation is becoming more and more complex (e.g. hand over from GSM to WLAN). With IP networks becoming common, mobility is often being implemented by using mobile IP. There is also currently ongoing work to implement a voice call continuity service that focuses on the hand over from circuit switched voice system to packet voice systems.

Currently, a problem occurs whenever IP end points move and utilize the nomadic mobility provided by IP networks via, for example, the Dynamic Host Configuration Protocol (DHCP). When a terminal starts to use a new interface, or when the terminal moves, e.g. from one hotspot to another, it is common for the applications IP address and terminal routing table to change, as the IP address is tied to an interface. This causes current communications applications to loose connectivity. In IP-based networking, the applications are unaware of the access technologies that are used, and terminal applications usually only send packets to some destination IP address that the terminal routes according to the terminal's routing table (the routing table chooses the interface to be used).

In most instances, the routing table utilizes a default route that points to a connected interface that has the highest priority. It is possible that, during a communications session, the terminal may attach to a higher priority interface (e.g. WLAN) and the default route changes, causing an ongoing communications session to drop. It is also possible that the terminal may move out of coverage for a certain interface (e.g., out of a WLAN hot spot) so that the default route starts pointing to some other interface (e.g., WCDMA). Whenever the used interface changes, the IP address also changes. Otherwise, returning packets may experience black hole routing, as the previous interface may no longer be reachable from the Internet.

SUMMARY OF THE INVENTION

The present invention provides an improved system and method for implementing communications hand over in a simple manner. In various embodiments of the present invention, RTP is used to signal other users that an IP address has been changed. The receiving communications application notices from the RTP data flow that the other party in a communications session has changed its IP address. Based on this information, the communications application adjusts the communications session without having to perform any session signaling.

The system and method of the various embodiments of the present invention is suitable with all different signaling protocols, e.g., Session Initiation Protocol (SIP), H.323, Media Gateway Control Protocol (MGCP), Extensible Messaging and Presence Protocol (XMPP), etc. Additionally, no equipment or control is needed in the network to assist in the "hand over" from one interface to another. Instead, the various embodiments can be implemented purely within the terminal applications. Additionally, the terminal can make decisions about which interfaces to use, prefer and prioritize. Furthermore, no additional signaling traffic is required in the communications control layer, and any party to a communications session can perform the hand over. Still further, the various embodiments of the present invention are not tied to any specific access technology. Instead, the various embodiments can be used within the same access in the event that the IP address is changed (e.g. from one WLAN hotspot to another WLAN hotspot), or the embodiments can be used when moving from one access network to another (e.g. from a WCDMA network to a WLAN network). Lastly, the accesses that are used by a terminal can come from different operators.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

The present invention provides an improved system and method for implementing communications hand over in a simple manner. In various embodiments of the present invention, RTP is used to signal other users that an IP address has been changed. The receiving communications application notices from the RTP data flow that the other party in a communications session has changed its IP address. Based on this information, the communications application adjusts the communications session without having to perform any session signaling.

According to various embodiments of the present invention, whenever an IP-based terminal of a user attaches to a new network, where the terminal has the highest priority in the terminal routing table, or whenever the interface with highest priority is detached from the network, the default route in the terminal routing table is changed. In this situation, the communications session is not interrupted during the various embodiments of the present invention. Instead, the communications application continues to send RTP packets to the intended destination with the new source IP address. In these transmission, the same synchronization source (SSRC) identifier is used in the RTP headers as was used previously, and the timestamp and sequence continue without interruption. As the receiving communications application notices that the sender's IP address has been changed in the RTP packets, it adapts to this and also starts sending its RTP packets to the new IP address used by the other party. At the same time, the user whose IP address has been changed is also expecting to receive packets from the new interface. Based on these changes in the RTP flows, both parties modify the session information and/or parameters without making any new signaling. This hand over process does not change anything else in the communications session except the IP address of one of the parties involved. There is therefore no need to perform a session update.

Figure 1:
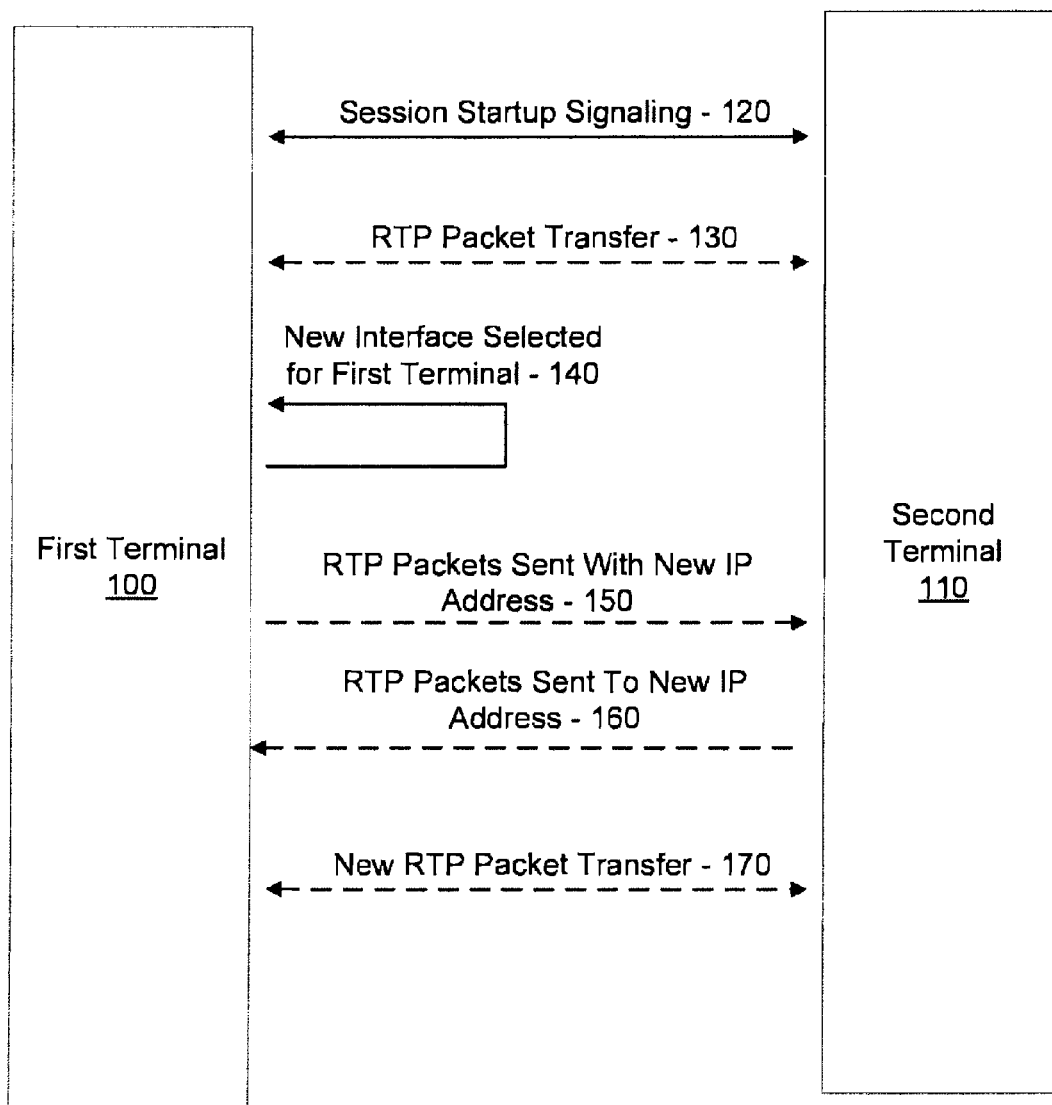
FIG. 1 is a depiction of the process by which a changed interface/IP address is signaled using RTP packets in accordance with one embodiment of the present invention.

FIG. 1 is a depiction of the process by which a changed interface/IP address is signaled using RTP packets in accordance with one embodiment of the present invention. At 120 in FIG. 1, session startup signaling is conducted between a first terminal 100 and a second terminal 110. At 130, once the session startup signaling is completed, RTP packets are transferred between the terminals in a normal manner. At 140, a new interface is selected for the first terminal. In response to this occurrence, at 150 subsequent RTP packets are sent to the same IP address for the second terminal, with these RTP packets possessing a new source IP address but the same SSRC identifier. Additionally, the packets are transmitted using the ongoing timestamps and sequence numbers.

Upon receiving the RTP packets from the first terminal 100 with the new IP address, at 160 the second terminal 110 updates its settings and transmits new RTP packets to the first terminal 100 at the new IP address. From this point forward, subsequent RTP packets are transferred 170 between the first terminal 100 and the second terminal 110 as normal.

Until the second terminal 110 notices that the IP address for the first terminal 100 has changed, the second terminal continues to send packs to the old IP address of the first terminal. In the event that the first terminal 100 still has the previously-used interface active, then it can continue to receive packets via the old interface from the second terminal 110 until the second terminal adapts to sending to the new IP address. In this case no break will occur in the communications session. In the event that an IP address is changed because of a previous default interface is detached from the network (e.g. a connection is lost), then a break will occur in the communication from the second terminal 100 towards the first terminal 110 until the second terminal 110 has noticed the change and has adapted accordingly.

In implementing the various embodiments of the present invention, few changes are required to existing system requirements. In particular, the Network Working Group's Request for Comments (RFC) 3550, which can be found at www.ietf.org/rfc/rfc3550.txt and is incorporated by reference herein in its entirety, states in chapter 8.2 that "if a source changes its source transport address, it may also choose a new SSRC identifier to avoid being interpreted as a looped source." Therefore, RFC 3550 permits the same SSRC to be used when the IP address is changed.

The various embodiments of the present invention is suitable for use in IP-based communications in a flat rate type of charging systems. Additionally, the various embodiments can be implemented with regard Internet-model lightweight communications that do not keep tight control of network events.

The system and method of the various embodiments of the present invention is suitable with all different signaling protocols, e.g., Session Initiation Protocol (SIP), H.323, Media Gateway Control Protocol (MGCP), etc. Additionally, no equipment or control is needed in the network to assist in the "hand over" from one interface to another. Instead, the various embodiments can be implemented purely within the terminal applications. Additionally, the terminal can make decisions about which interfaces to use, prefer and prioritize. Furthermore, no additional signaling traffic is required in the communications control layer, and any party to a communications session can perform the hand over. Still further, the various embodiments of the present invention are not tied to any specific access technology. Instead, the various embodiments can be used within the same access in the event that the IP address is changed (e.g. from one WLAN hotspot to another WLAN hotspot), or the embodiments can be used when moving from one access network to another (e.g. from a WCDMA network to a WLAN network). The accesses that are used by a terminal can come from different operators.

Figure 2:
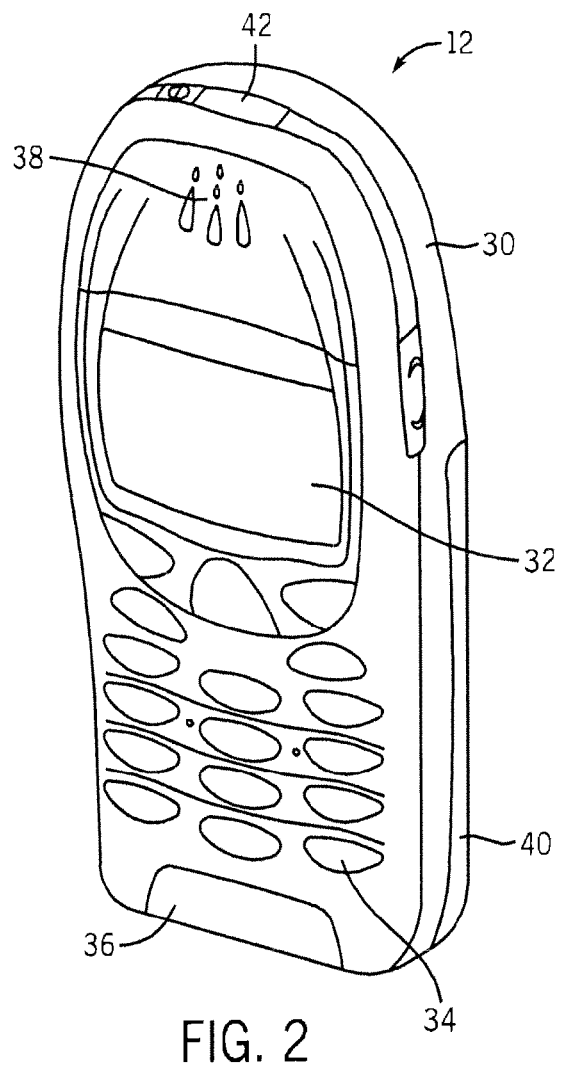
FIG. 2 is a perspective view of an electronic device that can be used in the implementation of the present invention.
Figure 3:
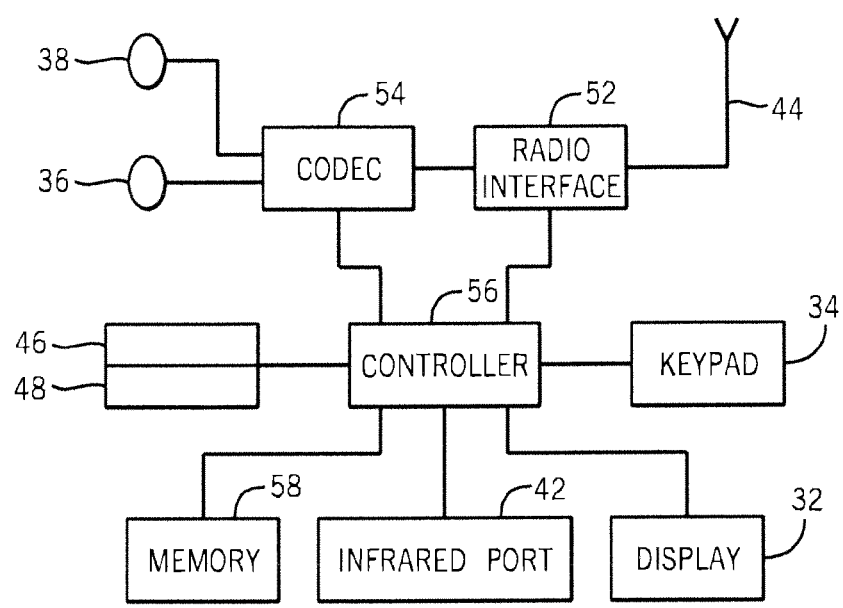
FIG. 3 is a schematic representation of the circuitry of the electronic device of FIG. 2.

FIGS. 2 and 3 show one representative electronic device 12 within which the present invention may be implemented. It should be understood, however, that the present invention is not intended to be limited to one particular type of electronic device 12 or other electronic device. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, and a memory 58. Individual circuits and elements are all of a type well known in the art, for example in the Nokia range of mobile telephones.

The exemplary communication devices which are capable of implementing various embodiments of the present invention may include, but are not limited to, a mobile telephone, a combination PDA and mobile telephone, a PDA, an integrated messaging device (IMD), a desktop computer, and a notebook computer. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. The communication devices may communicate using various transmission technologies including, but not limited to, CDMA, GSM, Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The program code for executing steps of the methods disclosed herein may be stored on a computer readable medium, which may be embodied in various forms. Memory 58 of FIG. 3 is one example of a computer readable medium. Alternatively, a computer readable medium may be embodied by two or more memory units.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   receiving through a first interface of a terminal a plurality of first Real-Time Transport Protocol (RTP) packets from a remote terminal, the plurality of first RTP packets being directed to an initial internet protocol (IP) address of the terminal and including a synchronization source (SSRC) identifier and first session content data of an RTP communication session, the RTP communication session for exchanging session data between the terminal and the remote terminal;
   initiating a hand over in the RTP communication session including initiating a second interface that changes an internet protocol address of the terminal from the initial IP address to a different IP address; and
   informing the remote terminal that the hand over changed the internet protocol address of the terminal by transmitting, from the terminal, one or more second RTP packets to the remote terminal, wherein each RTP packet of the one or more second RTP packets includes the different IP address, the same SSRC identifier and one or more portions of second session content data, the one or more second RTP packets associated with the RTP communication session,
   wherein the one or more second RTP packets that include the different IP address, the same SSRC identifier, and one or more portions of second session data are the only signal that informs the remote terminal that the hand over changed the internet protocol address of the terminal.

2. The method of claim 1, further comprising, subsequent to transmitting the one or more second RTP packets, receiving a plurality of third RTP packets through the second interface from the remote terminal, the plurality of third RTP packets being directed to the different IP address.

3. The method of claim 1, further comprising:
   maintaining use of the first interface after the initiation of the second interface; and
   continuing to receive RTP packets through the first interface for a time after the hand over changed the internet protocol address of the terminal.

4. The method of claim 1, wherein the one or more second RTP packets are transmitted using timestamps and sequences that continue in order, without interruption, relative to previously-transmitted RTP packets that included the initial IP address, the same SSRC identifier, and previously-transmitted session content data.

5. One or more non-transitory computer-readable media storing computer readable-instructions that, when executed, cause an apparatus to at least:
   process a plurality of first Real Time Transport Protocol (RTP) packets received through a first interface of the apparatus from a remote terminal, the plurality of first RTP packets being directed to an initial internet protocol (IP) address of the apparatus and including a synchronization source (SSRC) identifier and first session content data of an RTP communication session, the RTP communication session for exchanging session data between the apparatus and the remote terminal;
   initiate a hand over in the RTP communication session including initiating a second interface that changes an internet protocol address of the apparatus from the initial IP address to a different IP address; and
   inform the remote terminal that the hand over changed the internet protocol address of the apparatus by transmitting one or more second RTP packets to the remote terminal, wherein each RTP packet of the one or more second RTP packets includes the different IP address, the same SSRC identifier and one or more portions of second session content data, the one or more second RTP packets associated with the RTP communication session,
   wherein the one or more second RTP packets that include the different IP address, the same SSRC identifier, and the one or more portions of second session data are the only signal that informs the remote terminal that the hand over changed the internet protocol address of the apparatus.

6. The one or more non-transitory computer readable media of claim 5, further storing computer readable instructions that, when executed, further cause the apparatus to:
   subsequent to transmitting the one or more second RTP packets, process a plurality of third RTP packets received through the second interface from the remote terminal, the plurality of third RTP packets being directed to the different IP address.

7. The one or more non-transitory computer readable media of claim 5, further storing computer readable instructions that, when executed, cause the apparatus to:
maintain use of the first interface after the initiation of the second interface; and
continue to process RTP packets received through the first interface for a time after the hand over changed the internet protocol address of the apparatus.

8. The one or more non-transitory computer readable media of claim 5, wherein the one or more second RTP packets are transmitted using timestamps and sequences that continue in order, without interruption, relative to previously-transmitted RTP packets that included the initial IP address, the same SSRC identifier, and previously-transmitted session content data.

9. An apparatus, comprising:
a processor; and
memory storing computer readable instructions configured to, with the processor, cause the apparatus to at least:
process a plurality of first Real Time Transport Protocol (RTP) packets received through a first interface of the apparatus from a remote terminal, the plurality of first RTP packets being directed to an initial internet protocol (IP) address of the apparatus and including a synchronization source (SSRC) identifier and first session content data of an RTP communication session, the RTP communication session for exchanging session data between the apparatus and the remote terminal;
initiate a hand over in the RTP communication session including initiating a second interface that changes an internet protocol address of the apparatus from the initial IP address to a different IP address;
inform the remote terminal that the hand over changed the internet protocol address of the apparatus by transmitting one or more second RTP packets to the remote terminal, wherein each RTP packet of the one or more second RTP packets includes the different IP address, the same SSRC identifier and one or more portions of second session data, the one or more second RTP packets associated with the RTP communication session,
wherein the one or more second RTP packets that include the different IP address, the same SSRC identifier, and the one or more portions of second session data are the only signal that informs the remote terminal that the hand over changed the internet protocol address of the apparatus.

10. The apparatus of claim 9, wherein the memory further stores computer readable instructions configured to, with the processor, cause the apparatus to:
subsequent to transmitting the one or more second RTP packets, process a plurality of third RTP packets received through the second interface from the remote terminal, the plurality of third RTP packets being directed to the different IP address.

11. The apparatus of claim 9, wherein the memory further stores computer readable instructions configured to, with the processor, cause the apparatus to:
maintain use of the first interface after the initiation of the second interface; and
continue to receive RTP packets through the first interface for a time after the hand over changed the internet protocol address of the apparatus.

12. The apparatus of claim 9, wherein the one or more second RTP packets are transmitted using timestamps and sequences that continue in order, without interruption, relative to previously-transmitted RTP packets that included the initial IP address, the same SSRC identifier, and previously-transmitted session content data.

13. A method comprising:
transmitting, from a terminal, a plurality of first Real Time Transport Protocol (RTP) packets to a first interface of a remote terminal, the plurality of first RTP packets being directed to an initial internet protocol (IP) address and including a synchronization source (SSRC) identifier and first session content data of an RTP communication session, the RTP communication session for exchanging session data between the terminal and the remote terminal;
receiving, at the terminal, one or more second RTP packets from the remote terminal, wherein each RTP packet of the one or more second RTP packets includes a second IP address for the remote terminal, the same SSRC identifier and one or more portions of second session content data, the one or more second RTP packets associated with the RTP communication session; and
subsequent to receiving the one or more second RTP packets, transmitting a plurality of third RTP packets to a second interface of the remote terminal, the second interface corresponding to the second IP address, wherein the plurality of third RTP packets is associated with the RTP communication session;
wherein the one or more second RTP packets are the only signal that informs the terminal of a hand over in the RTP communication session.

14. The method of claim 13, wherein the one or more second RTP packets include timestamps and sequences that continue in order, without interruption, relative to RTP packets previously-transmitted by the remote terminal that included the initial IP address, the same SSRC identifier, and previously-transmitted session content data.

15. An apparatus, comprising:
a processor; and
memory storing computer readable instructions that, when executed, cause the apparatus to at least:
transmit a plurality of first Real Time Transport Protocol (RTP) packets to a first interface of a remote terminal, the plurality of first RTP packets being directed to an initial internet protocol (IP) address and including a synchronization source (SSRC) identifier and first session content data of an RTP communication session, the RTP communication session for exchanging session data between the apparatus and the remote terminal;
process one or more second RTP packets received from the remote terminal, wherein each RTP packet of the one or more second RTP packets includes a second IP address for the remote terminal, the same SSRC identifier and one or more portions of second session content data, the one or more second RTP packets associated with the RTP communication session; and
subsequent to receiving the one or more second RTP packets, transmit a plurality of third RTP packets to a second interface of the remote terminal, the second interface corresponding to the second IP address, wherein the plurality of third RTP packets is associated with the RTP communication session;
wherein the one or more second RTP packets are the only signal that informs the apparatus of a hand over in the RTP communication session.

16. The apparatus of claim 15, wherein the one or more second RTP packets include timestamps and sequences that continue in order, without interruption, relative to RTP packets previously-transmitted by the remote terminal that included the initial IP address, the same SSRC identifier, and previously-transmitted session content data.

17. A system comprising:
    a first terminal; and
    a second terminal configured to:
    receive through a first interface a plurality of first Real Time Transport Protocol (RTP) packets from the first terminal, the plurality of first RTP packets being directed to an initial internet protocol (IP) address of the second terminal and including a synchronization source (SSRC) identifier and first session content data of an RTP communication session, the RTP communication session for exchanging session data between the second terminal and the first terminal;
    initiate a hand over in the RTP communication session including initiating a second interface that changes an address of the second terminal from the initial IP address to a different IP address;
    informing the first terminal that the hand over changed the address of the second terminal by transmitting one or more second RTP packets to the first terminal, wherein each RTP packet of the one or more second RTP packets includes the different IP address for the second terminal, the same SSRC identifier and one or more portions of second session content data, the one or more second RTP packets associated with the RTP communication session,
    wherein the one or more second RTP packets that include the different IP address, the same SSRC identifier, and the one or more portions of second session data are the only signal that informs the first terminal that the hand over changed the address of the second terminal.

18. The system of claim 17, wherein the first terminal is configured to transmit a plurality of third RTP packets to the second interface, the second interface corresponding to the different IP address.

19. The system of claim 17, wherein the one or more second RTP packets include timestamps and sequences that continue in order, without interruption, relative to RTP packets previously-transmitted by the second terminal that included the initial IP address, the same SSRC identifier, and previously-transmitted session content data.

20. The system of claim 17, wherein the second terminal is configured to:
    continue the use of the first interface after the initiation of the second interface;
    continue receiving RTP packets through the first interface from the first terminal for a time after the hand over changed the address of the second terminal.

* * * * *